UNITED STATES PATENT OFFICE.

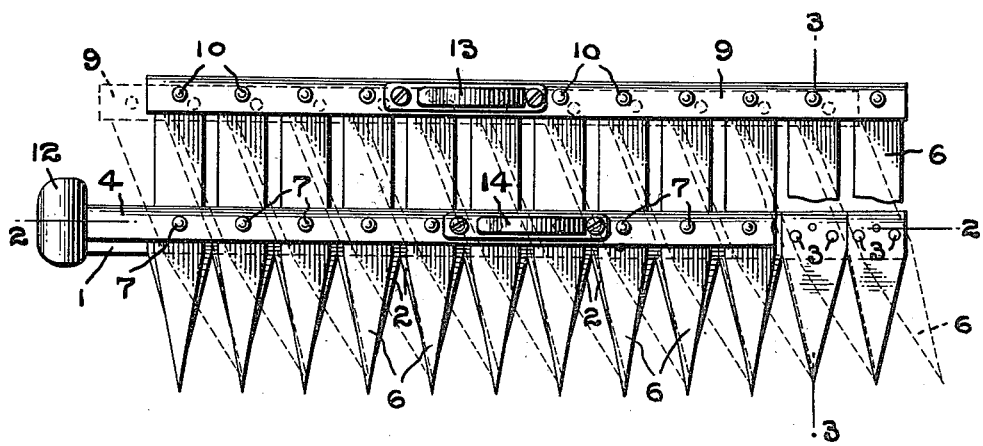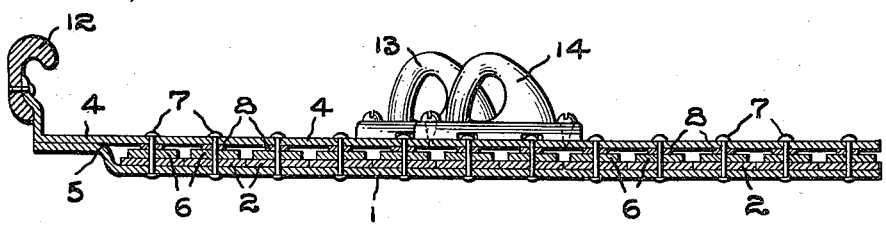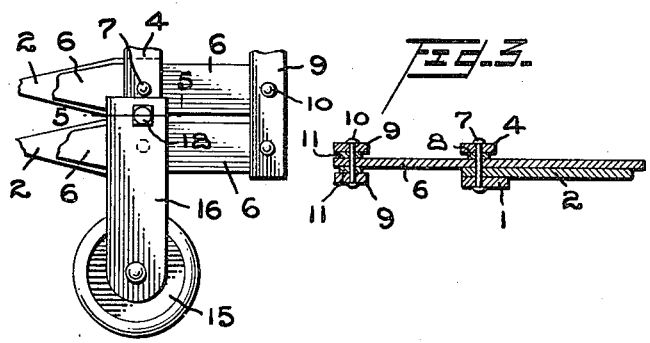

LOUIS HAMMEL, OF PHILADELPHIA, PENNSYLVANIA.

HEDGE-TRIMMER.

1,144,542. Specification of Letters Patent. Patented June 29, 1915.

Application filed October 23, 1914. Serial No. 868,195.

*To all whom it may concern:*

Be it known that I, LOUIS HAMMEL, a citizen of the United States, residing at Philadelphia, in the county of Philadelphia and State of Pennsylvania, have invented certain new and useful Improvements in Hedge-Trimmers, of which the following is a specification.

My invention relates to improvements in hedge trimmers, the object of the invention being to provide a device of the character stated which is adapted to cut a considerable amount of hedge at one time, and to permit the hedge to be trimmed in a straight line without irregularities which are so common in hedges trimmed with the ordinary devices in general use.

A further object is to provide a hedge trimmer which may be operated in either a vertical or horizontal position to trim the edge and sides of the hedge, and which will quickly and accurately perform the functions for which it is intended.

With these and other objects in view, the invention consists in certain novel features of construction and combinations and arrangements of parts as will be more fully hereinafter described and pointed out in the claims.

In the accompanying drawings: Figure 1 is a plan view illustrating my improvements. Fig. 2 is a view in section on the line 2—2 of Fig. 1. Fig. 3 is a view in cross section on the line 3—3 of Fig. 1. Fig. 4 is a fragmentary view in side elevation showing a modification in which a wheel is attached to the lower end of the device for use when cutting the sides of a hedge, and Fig. 5 is a view in section on the line 5—5 of Fig. 4.

1 represents a bar to which the longitudinal series of stationary V-shaped blades 2 are secured by rivets 3. Above the bar 1, a bar 4 is located, and the ends of bar 1 are bent upwardly as shown at 5 to bring the two bars 1 and 4 together.

A longitudinal series of pivoted blades 6 are located above the fixed blades 2, and are pivotally supported between their ends by rivets 7. The rivets 7 extend through the bar 4, through washers 8 interposed between the bar and the pivoted blades, and thence through the pivoted blades, the stationary blades, and the bar 1, and up-set at their ends to securely hold the parts together.

The forward ends of the pivoted blades 6 are V-shaped and have both side edges sharp, so that the blades cut in both directions against the edges of the stationary blades 2. It will also be noted that the pivoted blades are slightly longer than the stationary blades, so that a cutting action is had throughout the entire length of the stationary blades as indicated by the dotted lines in Fig. 1.

The rear ends of the pivoted blades 6 are located between parallel bars 9, and are pivotally connected to said bars by rivets 10. Washers 11 are interposed between the bars 9 and the pivoted blades 6, and the rivets 10 extend through the bars, the washers and the blades securely coupling the parts together and yet giving sufficient play to prevent any binding action and reducing friction to a minimum.

On the end of the bar 4, a combined body brace and handle 12 is located, and handles 13 and 14 are secured to the bars 4 and 9 respectively.

When the device is to be used in a vertical position to cut the side of a hedge, I attach a wheel 15 as shown in Figs. 4 and 5. The wheel 15 is mounted in a bracket 16 and the latter is recessed in its upper end as shown at 17 to receive the ends of bars 1 and 4, and a set screw 18 securely holds the bracket 16 on the device.

In operation, assuming the device to be used in the horizontal position to cut the top of the hedge, the part 12 is placed against the body, and the handles 13 and 14 are gripped by the right and left hand respectively. While in this position, the operator moves the handle 14 relative to the handle 13, causing the pivoted blades to cut in both directions as they are moved.

When the device is used in a vertical position to cut the side of a hedge, the part 12 is gripped by one hand, and the handle 14 by the other hand, so that the blades may be moved by the movement of the handle 13.

While I have used the term "rivets" to describe the connections of the several parts, I would have it understood that the invention is not limited to any particular form of such connecting devices.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A hedge trimmer comprising a bar having a device at one end adapted to be positioned against the body of the user, and constructed for use as a handle, a longitudinal series of fixed blades on the bar, a longitudinal series of pivoted blades pivotally connected to the said bar, a bar pivotally connecting the rear ends of all of said pivoted blades, a bar on top of the pivoted blades at their point of pivotal connection with the first-mentioned bar, and handles on the intermediate portions of both of said last-mentioned bars, substantially as described.

2. A hedge trimmer comprising two members adapted to move relative to each other, a longitudinal series of fixed blades on one of said members, a longitudinal series of pivoted blades pivotally connected between their ends to the member carrying the fixed blades, and at their rear ends to the other of said members, and handles on the respective members, between the ends of the members, and a third handle secured to one end of the member carrying the fixed blades, substantially as described.

In testimony whereof I have signed my name to this specification in the presence of two subscribing witnesses.

LOUIS HAMMEL.

Witnesses:
C. R. ZIEGLER,
C. E. POTTS.

Copies of this patent may be obtained for five cents each, by addressing the "Commissioner of Patents, Washington, D. C."